United States Patent
Lee et al.

(10) Patent No.: US 10,303,984 B2
(45) Date of Patent: May 28, 2019

(54) VISUAL SEARCH AND RETRIEVAL USING SEMANTIC INFORMATION

(71) Applicant: INTEL CORPORATION, Santa Clara, CA (US)

(72) Inventors: Teahyung Lee, Chandler, AZ (US); Krishna Kumar Singh, Davis, CA (US); Myung Hwangbo, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/156,466

(22) Filed: May 17, 2016

(65) Prior Publication Data

US 2017/0337271 A1 Nov. 23, 2017

(51) Int. Cl.
*G06K 9/62* (2006.01)
*G06K 9/00* (2006.01)
*G06K 9/46* (2006.01)
*G06F 16/783* (2019.01)

(52) U.S. Cl.
CPC ....... *G06K 9/6276* (2013.01); *G06F 16/7837* (2019.01); *G06K 9/00718* (2013.01); *G06K 9/00744* (2013.01); *G06K 9/4628* (2013.01); *G06K 9/6215* (2013.01)

(58) Field of Classification Search
CPC .......... G06F 17/30784; G06F 17/3053; G06K 9/6202; G06K 9/66; G06K 9/4604; G06K 9/6276
See application file for complete search history.

(56) References Cited

U.S. PATENT DOCUMENTS

| | | | |
|---|---|---|---|
| 7,000,200 B1 | 2/2006 | Martins | |
| 8,089,563 B2 | 1/2012 | Girgensohn et al. | |
| 8,243,203 B2 | 8/2012 | Suh | |
| 9,129,158 B1 | 9/2015 | Medasani et al. | |
| 2002/0080162 A1 | 6/2002 | Pan et al. | |
| 2004/0125877 A1 | 7/2004 | Chang et al. | |
| 2004/0189863 A1 | 9/2004 | Gu et al. | |
| 2004/0221322 A1* | 11/2004 | Shen | G06F 17/30796 725/135 |
| 2006/0059120 A1 | 3/2006 | Xiong et al. | |

(Continued)

OTHER PUBLICATIONS

Karpathy, Andrej, et al. "Large-scale video classification with convolutional neural networks." Proceedings of the IEEE conference on Computer Vision and Pattern Recognition. 2014.*

(Continued)

*Primary Examiner* — Menatoallah Youssef
(74) *Attorney, Agent, or Firm* — International IP Law Group, P.L.L.C.

(57) ABSTRACT

An apparatus for visual search and retrieval using sematic information is described herein. The apparatus includes a controller, a scoring mechanism, an extractor, and a comparator. The controller is to segment an incoming video stream into a plurality of activity segments, wherein each frame is associated with an activity. The scoring mechanism is to calculate a score for each segment, wherein the score is based, at least partially, on a classification probability of each frame. The extractor is to extract deep features from a highest ranked segment, and the comparator is to determine the top-K neighbors based on the deep features.

24 Claims, 9 Drawing Sheets

(56) References Cited

U.S. PATENT DOCUMENTS

| | | | |
|---|---|---|---|
| 2009/0041312 A1 | 2/2009 | Wakasugi | |
| 2009/0089587 A1 | 4/2009 | Brunk et al. | |
| 2009/0091443 A1 | 4/2009 | Chen et al. | |
| 2011/0182469 A1 | 7/2011 | Ji et al. | |
| 2012/0033949 A1* | 2/2012 | Lu | G11B 27/034 386/285 |
| 2013/0195359 A1 | 8/2013 | Yabu | |
| 2013/0259390 A1 | 10/2013 | Dunlop et al. | |
| 2014/0161354 A1 | 6/2014 | Curcio et al. | |
| 2014/0270482 A1 | 9/2014 | Chakraborty et al. | |
| 2016/0140395 A1 | 5/2016 | Kumar et al. | |
| 2016/0350336 A1* | 12/2016 | Checka | G06F 17/30268 |
| 2017/0017857 A1 | 1/2017 | Wolf et al. | |
| 2017/0109584 A1 | 4/2017 | Yao et al. | |

OTHER PUBLICATIONS

Karpathy, Andrej, et al. "Large-scale video classification with convolutional neural networks." Proceedings of the IEEE conference on Computer Vision and Pattern Recognition. 2014. (Year: 2014).*

Gkioxari (Gkioxari, Georgia, Ross Girshick, and Jitendra Malik. "Contextual Action Recognition with R* CNN." Proceedings of the 2015 IEEE International Conference on Computer Vision (ICCV). IEEE Computer Society, 2015.). (Year: 2015).*

PCT International Search Report, PCT Application No. PCT/US2016/058078, dated Jan. 25, 2017, 3 pages.

Hwangbo et al., "Video Summarization Using Semantic Information", U.S. Appl. No. 14/998,322, filed Dec. 24, 2015.

Chu et al, "Video Co-summerization: Video Summarization by Visual Co-occurence", Computer Vision Foundation, 2015, USA, 9 pages.

Fast et al., "Augur: Mining Human Behaviors from Fiction to Power Interactive Systems", Proceedings of the 2016 CHI Conference on Human Factors in Computing Systems, May 7-12, 2016, USA, 11 pages.

Rohrbach et al., "Script for Attribute-based Recognition of Composite Activities", ECCV 2012, Germany, 14 pages.

* cited by examiner

VISUAL SEARCH AND RETRIEVAL USING SEMANTIC INFORMATION

BACKGROUND ART

Electronic devices typically include image capture mechanisms capable of capturing images, still shots, and video data. Electronic devices include, but are not limited to, mobile and wearable devices. Video data can be easily captured and shared for a variety of purposes. Video data is typically recorded and saved locally or shared online. Due to ease of capture, users can save and share a large number of videos. However, users are unwilling to spend time and effort in going through the large amount of videos to locate a specific video or moment they want to watch or share. Additionally, the video data can consume a large amount of storage space.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Video retrieval is a computer vision system that searches and retrieves videos from a database of videos. Video retrieval enables a user to quickly search for the videos without manually browsing through all the videos. The video database may include video of a single user or could include videos of multiple users. This technology can also be very beneficial for wearable devices, as users tend to collect large amount of videos using these devices and having good retrieval mechanism will help them in video search and organizing their collections.

The past few years have seen an exponential rise in the quantity, quality and diversity of video data. Most of these video data are present in unstructured format collected by user using cameras available on mobile phone and wearable devices. Such video collections make it challenging for users to organize and retrieve specific videos.

Most of the previous methods used low level hand crafted features (like SIFT, HOG). These features cannot capture the high level semantic information which limited the scope of the retrieval and made it prone to the error. Also these approaches focused mostly on images instead of the videos.

In the present techniques, video retrieval is performed using high level semantic information. Instead of relying on hand-crafted features like SIFT or HOG, we employ a current state of-the-art CNN (Convolutional Neural Network) that extracts data-driven features. This deep features not only captures semantic information but are also more invariant to erratic camera motion, illumination change and scene clutter. Also in our approach we take in account temporal nature of the video and devise techniques which handles multiple frames present in the video.

Embodiments described herein enable a visual search and retrieval using semantic information. In embodiments, a most important video is selected, and multiple frames from each video are represented by a single deep feature. The deep feature is to capture semantic information and retrieve similar videos by finding the nearest neighbors in a deep feature space.

In embodiments, the deep features may be used to determine high-level semantic contexts (e.g. activities, objects, locations, and people) residing in a video and produces content-aware summary with an importance scoring mechanism from the semantic contexts. Instead of relying on hand-crafted features, convolutional neural networks are used that extracts data-driven features from millions of images. This deep feature is more invariant to erratic camera motion, illumination change and scene clutter that happen severely in long hour or unedited videos captured by normal users.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
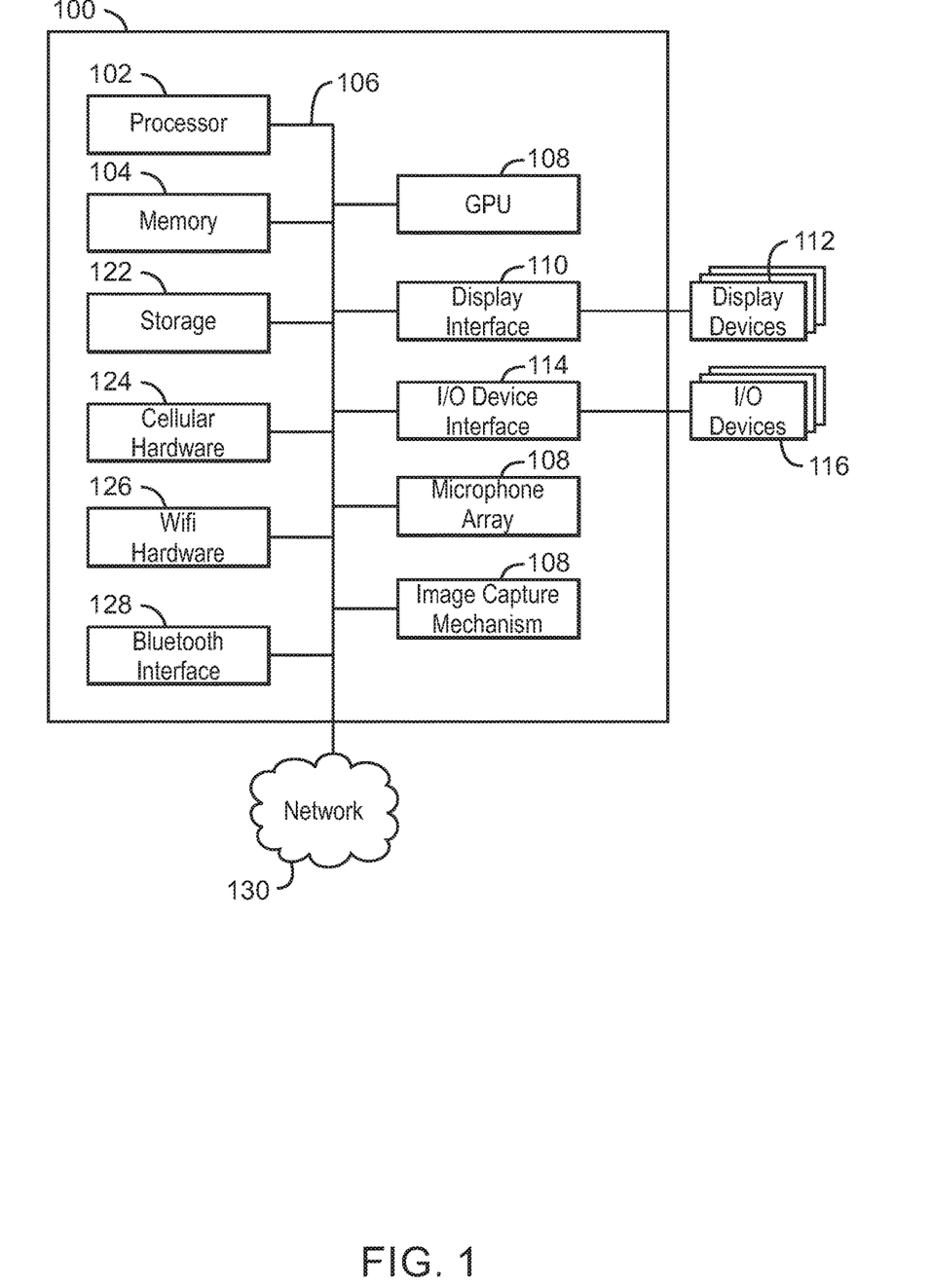
FIG. 1 is a block diagram of an electronic device that enables a visual search and retrieval using semantic information.

FIG. 1 is a block diagram of an electronic device that enables visual search and retrieval using semantic information. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, or the like, to be displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to a display device 122. The display device 122 can include a display screen that is a built-in component of the electronic device 100. The display device 122 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100.

Accordingly, the electronic device 100 also includes a microphone array 118 for capturing audio. The microphone array 118 can include any number of microphones, including two, three, four, five microphones or more. In some embodiments, the microphone array 118 can be used together with an image capture mechanism 120 to capture synchronized audio/video data, which may be stored to a storage device 122 as audio/video files.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

High level content in a video may be used as a query to find similar videos and/or images. In embodiments, an input video from the GPU 108 or storage 122 can be summarized in a context aware fashion. A context-aware video summary can be generated from unedited videos captured by wearable and mobile devices. High-level semantic entities may be extracted, such as activities, objects and places from a video by using deep network like CNN (Convolutional Neural Network). A scoring mechanism may be implemented that evaluates an importance level of each scene based on the correlation between semantic information, such as the co-occurrence between activities and objects. Semantic information can also include people, locations, landmarks, or any other recurring theme within a video. Deep features can be formed and used to find a set of best matches for similar videos based on the semantic information.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 130 is a cellular network.

The CPU 102 may also be linked through the bus 106 to WiFi hardware 126. The WiFi hardware is hardware according to WiFi standards (standards promulgated as Institute of Electrical and Electronics Engineers' (IEEE) 802.11 standards). The WiFi hardware 126 enables the wearable electronic device 100 to connect to the Internet using the Transmission Control Protocol and the Internet Protocol (TCP/IP), where the network 130 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the wearable electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2:
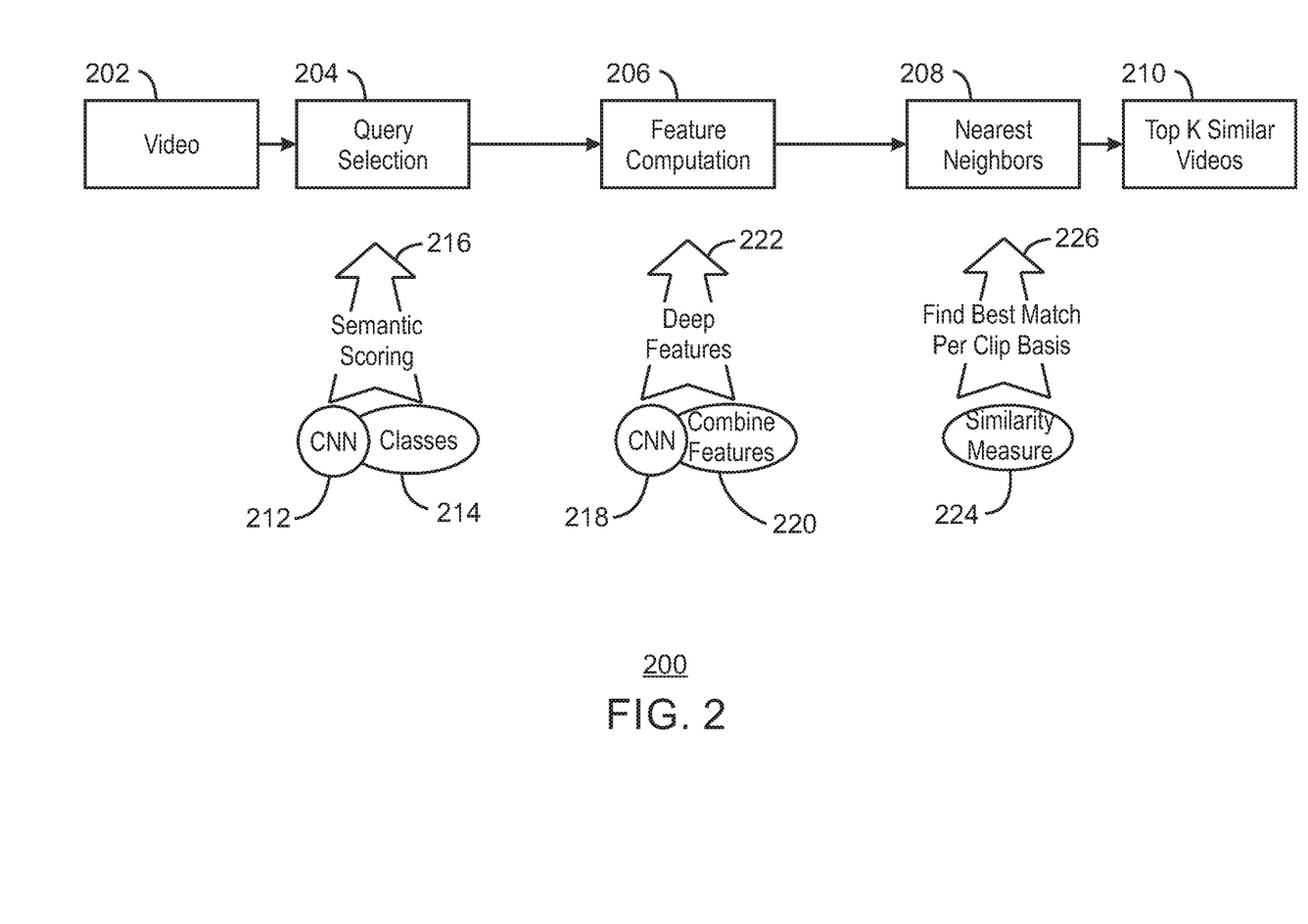
FIG. 2 is an overview of a visual search and retrieval pipeline.

FIG. 2 is an overview of visual search and retrieval using semantic information. The pipeline 200 represents a content-aware visual search and retrieval technique that generates a set of key frames from unedited video that is used for query selection. Features of the query video are determined, and a set of best matching videos is determined. At block 202, unedited video is obtained for input into the video search and retrieval pipeline. The video may be selected by a user. In embodiments, input may query may include keywords or phrases that indicate features of the query video. In embodiments, the video database may include video being currently captured by an image capture mechanism, a video being streamed to the device, or videos located in a store or saved videos. Additionally, the input video can be a movie or a television show. Each of a query selection block 204, a feature computation block 206, and a nearest neighbors block 208 are applied to the unedited input video from block 202. The result is the top K similar videos with regard to the unedited video input at block 202.

The length and content complexity of an input video according to the present techniques can cover a broader scope of use cases. Existing methods are usually restricted to video inputs containing a short and single event. From the benefit of deep features, which are more insensitive to illumination change, camera motion and scene clutter, a consistent activity scoring determination is achievable even for long hour videos with multiple events taken by wearable or mobile devices.

At block 204, query selection occurs. In query selection, a sub-scene from the unedited video is selected for the query. In embodiments, the query selection module 204 module determines the most important scenes or segments of the query video via semantic based scoring. In embodiments, activity based scoring may be used. In activity based scoring, the query video may be divided into a set of sub-scenes, where each sub-scene includes one or more activity segments. Objects may be detected in each activity segment and a score may be evaluated for each image frame weighted by an object-to-activity co-occurrence. A high score region that is the most important and salient moment within that activity segment is selected. A region is a specific area in the image. Scoring may also be based on other semantic information, such as locations, people, objects, backgrounds, and colors of the video.

In embodiments, the sub-scene may be the "most important" scene or segment of the video, as extracted using a deep network and scored. A deep network, as used herein, may be the result of a deep learning architecture that includes algorithms with many layers that can be used for feature extraction and transformation. Deep networks include a convolutional neural network (CNN) 212 that is a feed-forward artificial neural network with individual neurons tiled in a manner that response to overlapping regions in the visual field. For example, a convolutional neural network can consist of multiple layers of small neuron collections which can analyze each frame of the input video. The results of these collections are then tiled so that they overlap to obtain a better representation of the semantic information in the video data. The semantic information may include activity or objects present in the video data. This tiling can be repeated for every such layer of the convolutional neural network. In embodiments, the importance of each frame of the query video, according to an analysis of the semantic contents of each frame, is evaluated in connection with a scoring mechanism. Semantic contents, as used herein, refers to a meaning or content associated with contents of each frame. The importance associated with the semantic contents of each frame may be scored differently based on a relationship between the various semantic contents found in each frame.

At block 214, semantic information is used to determine semantic classes. Semantic classes may be used to classify each segment. Activity classes are used as an example according to the present techniques. However, any sematic information can be used to classify each frame or segment of the video. For example, objects in the frame can be used to classify each frame or segment of the video according to activities that may be occurring in the video. In embodiments, a CNN 212 can be used for activity classification. CNN (Convolutional Neural Network) recognizes the activity occurring in the input video and provide importance score to the frames with respect to the activity. The CNN 212 may be trained for twenty daily indoor/outdoor activities, such as brushing teeth, watching TV, using computer, eating food, making food, laundry, and etc. In this example, to find temporal segments in the video, each frame is first classified into one of the activity classes 214 by an activity classifier via the CNN 212. Once all the frames in the input video are classified, activity labels are temporally smoothened using a mode filter in order to prune misclassified labels. Each activity segment consists of continuous frames with the same activity in a minimum time. The segments shorter than a certain threshold are removed and adjacent segments belonging to the same activity are joined. Activity based scoring is applied to each video segment or sub-scene at arrow 216. The sub-scenes may be ranked, and the video sub-scene with the highest score is selected as the "most important" sub-scene from the unedited video 202.

At block 206, feature computation is performed. The semantic contents are extracted from the video using deep machine learning techniques like CNN 218. Features are combined at block 220. The combination of features results in deep features. Frames of the sub-scene are represented as deep features which are combined together to have a single deep feature representation for multiple frames. In embodiments, deep features trained from millions of images have a more discriminative power and in general show higher classification and detection accuracy than those from previously used hand-crafted features. A feature is a single element that characterizes aspects of data. A deep feature is synthesized from a plurality of features. In embodiments, a deep feature may be features found via deep learning. Additionally, a deep feature may be a feature that is supported by human intuition. Moreover, a deep feature may be a feature that generated using a relational dataset. In embodiments, relationships between semantic content such as an activity and an object within the video data is discovered. A sequence of mathematical functions may be applied to each relationship to extract a final deep feature. Each deep feature may have a particular depth, d.

At block 208, the nearest neighbors to the deep features are found. A similarity measure at block 224 is used to find the nearest neighbors to the deep features. In embodiments, the cosine similarity is a measure of similarity between two vectors of an inner product space that measures the cosine of the angle between them. The cosine similarity is used for ease of description, however, any similarity measure may be used. The similarity measure may be a similarity function that is a real-valued function that quantifies the similarity between two objects. The top K similar videos may be output at block 210.

Figure 3:
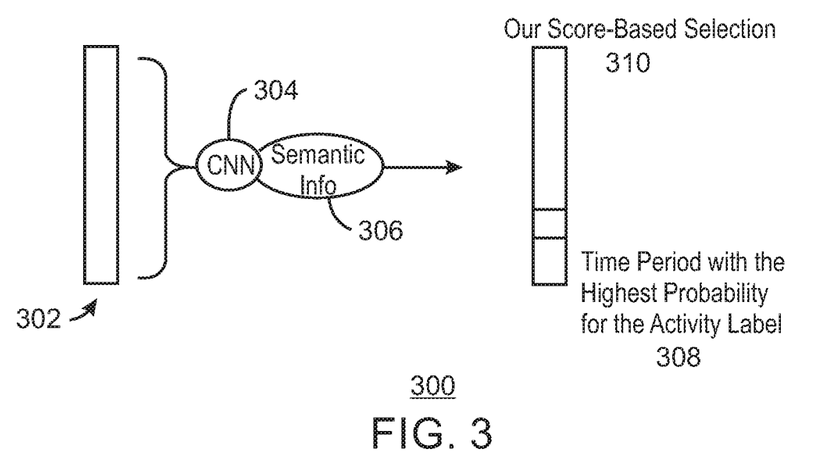
FIG. 3 is an illustration of query selection.

FIG. 3 is an illustration of query selection 300. In examples, the query selection is a query selection 204 (FIG. 2). For each query video 302, the best K seconds of video are selected via a CNN 304 and semantic information classifier 306. In embodiments, the CNN is an Alexnet initialized with MIT-Places Hybrid CNN used for activity classification. Once the video is divided into sematic based segments, the best moments from each segment are selected according to a scoring function. For example, for a given activity segment A, the following two scoring mechanisms may be applied. An activity based score is calculated as follows:

$$S1=\text{ProbAct}(f_i,A)$$

where ProbAct( ) is a classification probability returned by the activity classifier. The score S1 and classification probability is a degree of belief that an image frame $f_i$ at the time i belongs to activity class A. The scores resulting from the equation above is used to determine the most important sub-scenes in the query video. In FIG. 3, the output video 310 is illustrated with a second segment 308 with the highest probability that an image frame $f_i$ at the time i belongs to activity class A. In embodiments, the time period of the second segment 308 is selected as five seconds. The most important sub-scenes and or frames are sent to the feature computation module 206 (FIG. 2). The feature computation module 206 is to extract deep features from the most important frames selected from the query video.

Figure 4:
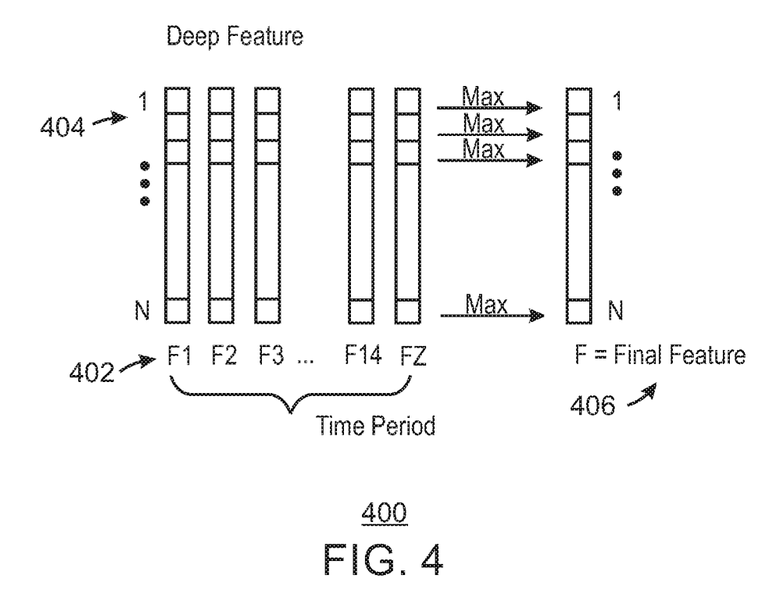
FIG. 4 is an illustration of combining segments.

FIG. 4 is an illustration of combining segments 400. In FIG. 4, frames 402 are extracted at a pre-set number of frames Z per second. For example, frames 402 may be extracted at three frames per second, resulting in Z=fifteen frames for a five second video segment. Each frame may include one or more features, where each feature is N-dimensional with layers 404 that total N. In the example of FIG. 4, each frame may represent a POOL5 feature, where the features are N=9216 dimensional. While a particular type of feature is described herein, the present techniques can be implemented using any type of feature. For example, the features may be one or multiple layers from convolutional layers or fully connected layers.

Deep features for multiple frames are combined by taking the maximum or average over each dimension of the feature space, resulting in a final feature 406. The final feature is a deep feature that is used to determine the top-K neighbors in a deep feature space. In embodiments, the intermediate output of deep networks is used as a feature representation for the frames. The initial N-dimensional layers capture local and low level information whereas deeper N-dimensional layers capture high level sematic information. In an example using POOL5 features, the POOL5 features are a result of maximum pooling on a fifth convolution layer output of the Alexnet, which provides good mix of high level and low level information. These networks are initialized with the parameters obtained from the network trained on millions of the images for classification task (e.g. MIT-Places Hybrid CNN). Also, the CNN can be fine-tuned for the classification on the local dataset (on which retrieval will be performed) to improve the performance.

Figure 5:
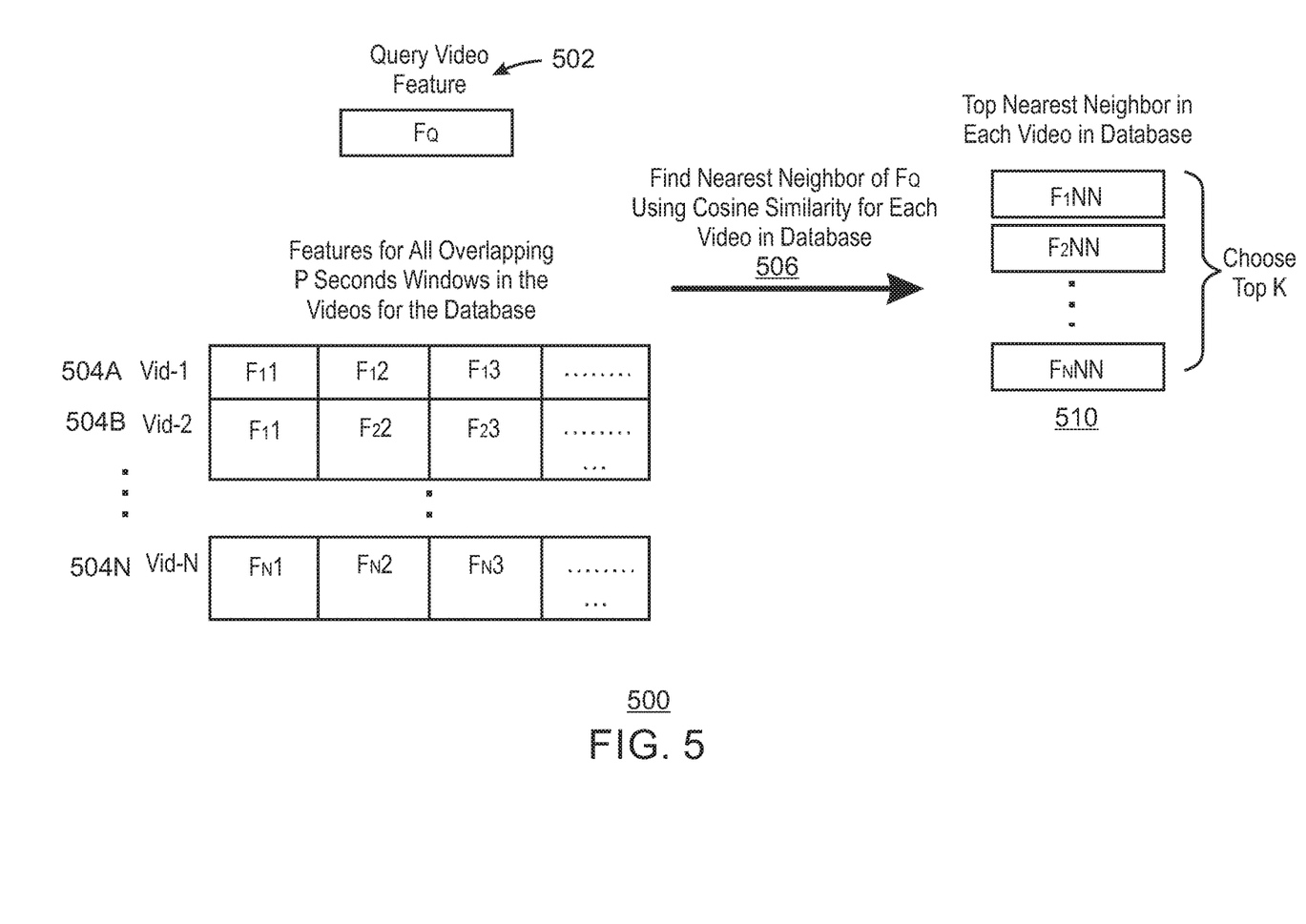
FIG. 5 is an illustration of finding the top K neighbors.

FIG. 5 is an illustration 500 of finding the top K neighbors. In embodiments, K can be any integer. For ease of description, K is equal to 5, however any integer value of K may be used according to the present techniques. After feature computation, the top-K nearest neighbors are found for the query clip of t second duration. The top-K nearest neighbors are found for the query video feature among all possible t second windows in video database using a similarity function. In examples, cosine similarity may be used to determine the top-K nearest neighbors.

The query video feature is represented at block 502. The query video feature may be a deep feature 406 (FIG. 4) of a deep feature 222 (FIG. 2). The features for a plurality of videos 504A, 504B . . . 504N are stored in a feature database. In embodiments, the features are for all overlapping P seconds of videos in the database. In embodiments, P may be equal to any number, such as five seconds. At block 506, the nearest neighbors of the query video feature 502 are found via a similarity measure, such as cosine similarity. At block 510, the top nearest neighbors the video database are extracted. In this manner, videos similar to the input query video may be obtained.

Consider, for example, a dataset consisting of a number of videos collected by different individuals capturing their everyday activities at their own homes. Along with videos, human annotations for semantic information, such as activities and object classes, may be provided for ground truth. A semantic classifier, such as an activity classifier for a number of classes may be learned for query selection using training videos. For quantitative evaluation, an activity label associated with query clip is matched with the activity labels of the top-K nearest neighbors. An Activity of Daily Living (ADL) dataset contains a start time and an end-time for each activity present in the video. Each query clip consists of the frames between start-time and end-time for the activities present in a pre-determined number test videos. The top-K nearest neighbors for each query clip is found and a mean average precision (fraction of semantic information for top-K nearest neighbors match with query clip label) is computed.

In examples, the dataset above may consist of twenty videos collected by different individuals capturing their everyday activities at their own homes. Human annotations may be provided for activities and object classes for a ground truth. Additionally, fifteen videos may be used for training and the remaining five videos are for testing. Most of these videos are thirty minutes long and contain multiple activities. The activity classifier may include twenty classes learned for query selection using the fifteen training videos. In this example, there may be one hundred twenty four query clips total. The top-K nearest neighbors for each query clip is found and a mean average precision (fraction of activity labels for top-K nearest neighbors match with query clip label) is computed.

In order to evaluate various approaches, following combinations are tried:

| Name | Feature | Combination | Query (5 sec) | Label Provided |
|---|---|---|---|---|
| Nonfinetune Avg | Non-finetune | Average | Middle | No |
| Finetune Avg | Finetune | Average | Middle | No |
| Finetune Max | Finetune | Max | Middle | No |
| Finetune Max - activity score (prediction) | Finetune | Max | Scoring | No |

| Name | Feature | Combination | Query (5 sec) | Label Provided |
|---|---|---|---|---|
| Finetune Max - activity score (ground truth) | Finetune | Max | Scoring | Yes |

As used herein, finetuning refers to a training technique for a CNN based learning system. Finetuning can improve results found from combining deep features. In embodiments, classes may be combined as many activity classes are visually very similar. Combined classes include (1) Make-up/comb, brush teeth, wash face/hand (bathroom); (2) Wash Dishes, make tea/coffee, drink water-bottle, making food (kitchen); and (3) Watching TV, using cell, drinking coffee (living room).

Figure 6:
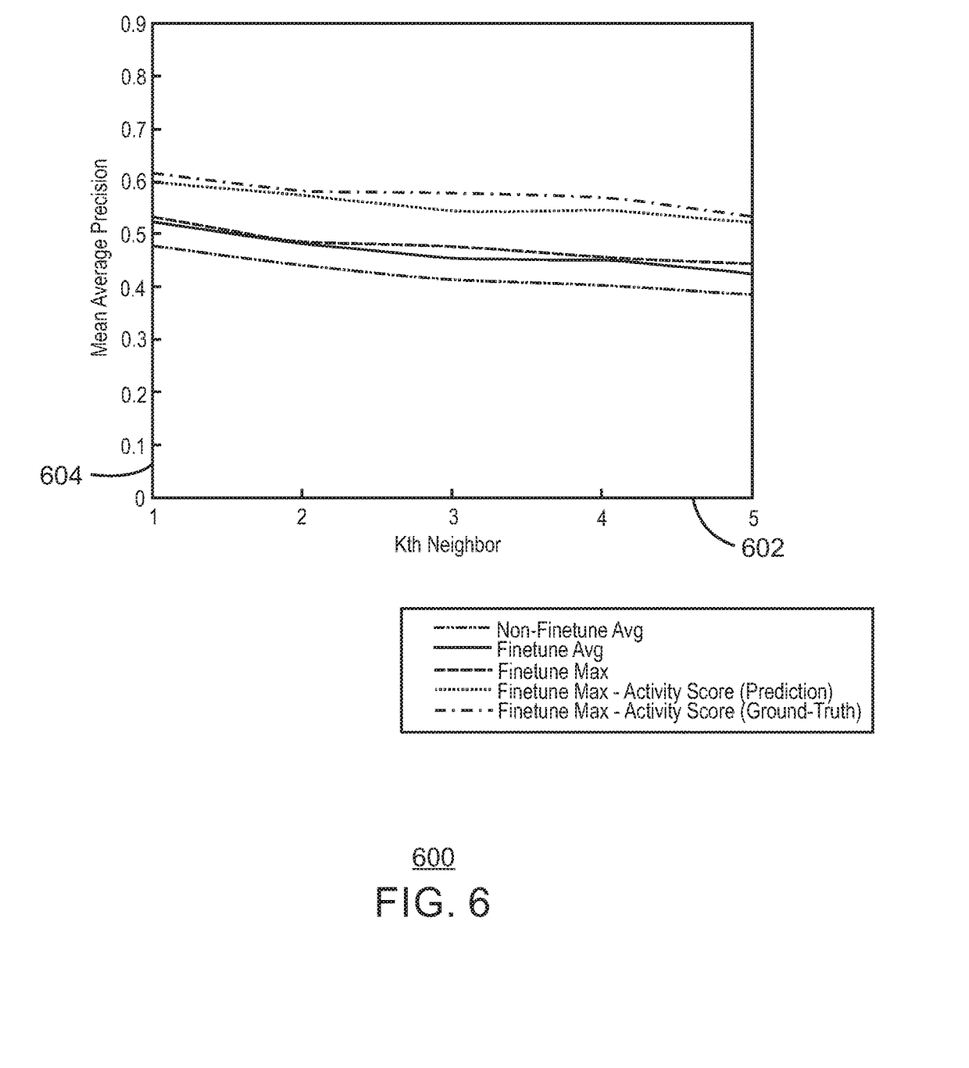
FIG. 6 is a graph illustrating mean average precision at different K values.

FIG. 6 is a graph 600 illustrating mean average precision at different K values after combining classes. The x-axis 602 represents the Kth neighbor, while the y-axis 604 represents the mean average precision. Visually similar classes are combined and number of classes are decreased to 13 when compared with FIG. 6.

In embodiments, taking the maximum value for each feature over different frames in the collocated positions while combining features produces better results than taking the average value. FIG. 4 illustrates using the maximum value N for each feature. Referring to the graph 600, fine-tuned features perform better than non-fine-tuned features. However, non-fine-tuned features still give decent precision not far behind fine-tuned features. As a result, the non-fine-tuned features learned on large variety of images like MIT Places Hybrid-CNN generalizes well and can be used for retrieval even if no annotation is available for fine-tuning. Additionally, using activity based scoring to choose best five seconds instead of choosing middle 5 seconds of the clip gives a boost in performance.

A scoring method based on predicting a semantic label provides a semantic classification. However, scoring is not dependent on a ground-truth label associated with the query video. But if a ground truth is available, algorithm can make use of it to improve the performance. Additionally, when semantic classes are combined, mean average precision improves to 61% for the first nearest neighbor. Moreover, if a user has a query video containing multiple activities and want to give importance to specific activity while doing retrieval then 'Finetune Max-activity score (ground-truth)' can be used where ground-truth label will be of the activity to which user want to give more importance.

Figure 7:
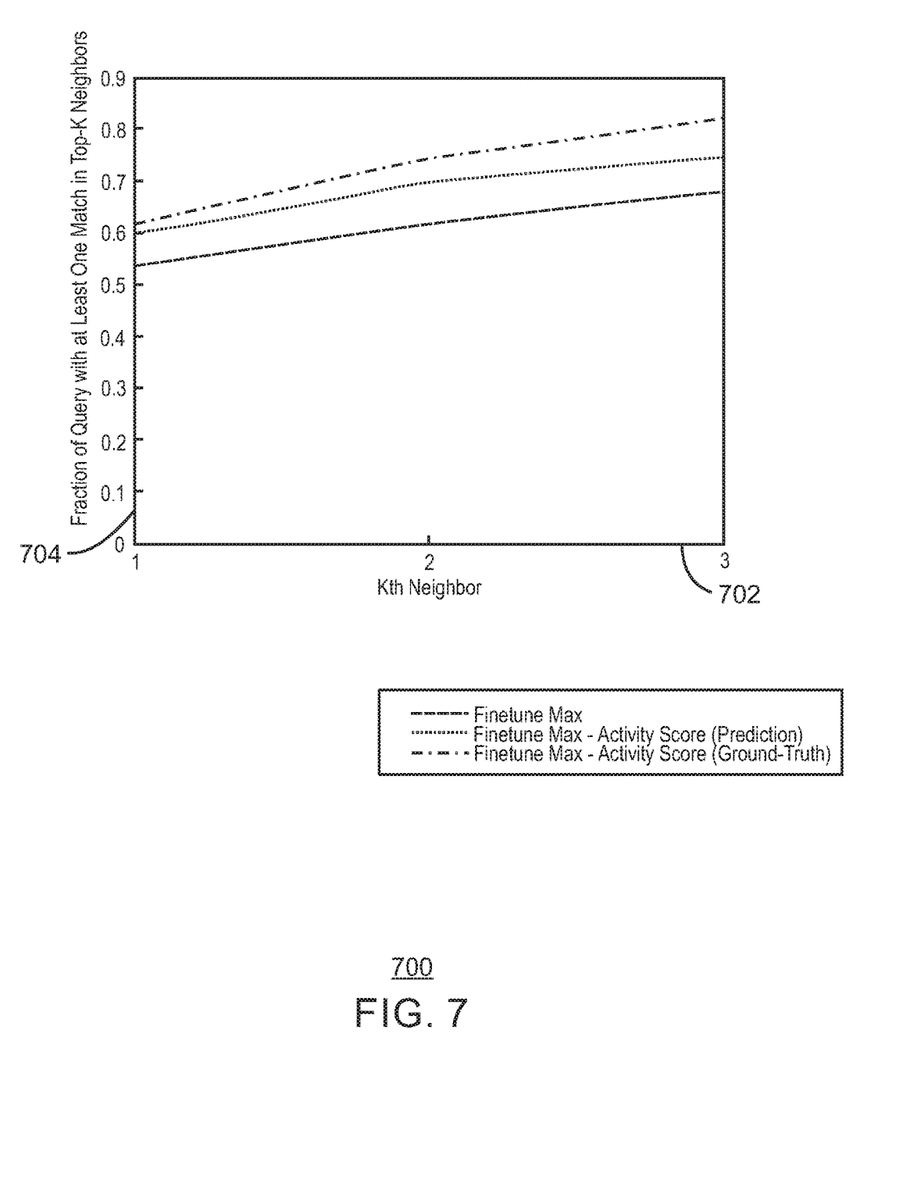
FIG. 7 is a graph illustrating fractional values at different K values.

FIG. 7 is a graph 700 illustrating fractional values at different K values after combining classes. The x-axis 702 represents the Kth neighbor, while the y-axis 704 represents the fraction of query with at least one match in the top-k neighbors. In FIG. 7, the retrieval system is evaluated by finding a fraction of query videos with at least one match in its top-K nearest neighbors.

Figure 8:
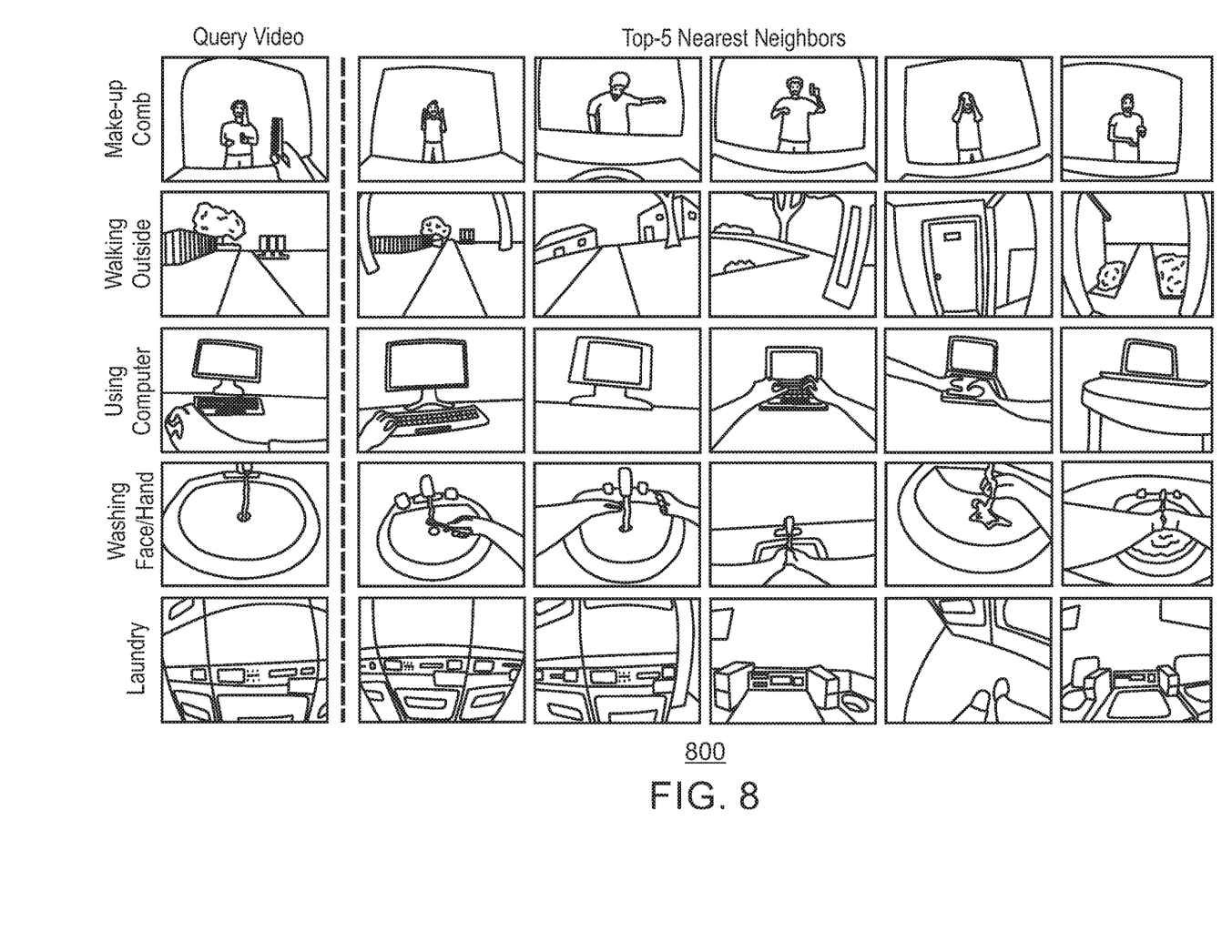
FIG. 8 illustrates the top K nearest neighbors for the query video.

FIG. 8 illustrates the top 5 nearest neighbors for the query video. In FIG. 8, the first frame for the query and nearest neighbor videos in each column are shown. These results are obtained using the 'Finetune Max-activity score (prediction)' as anoted in Table 1. These results demonstrate that nearest neighbors videos are visually similar to the query video.

Figure 9:
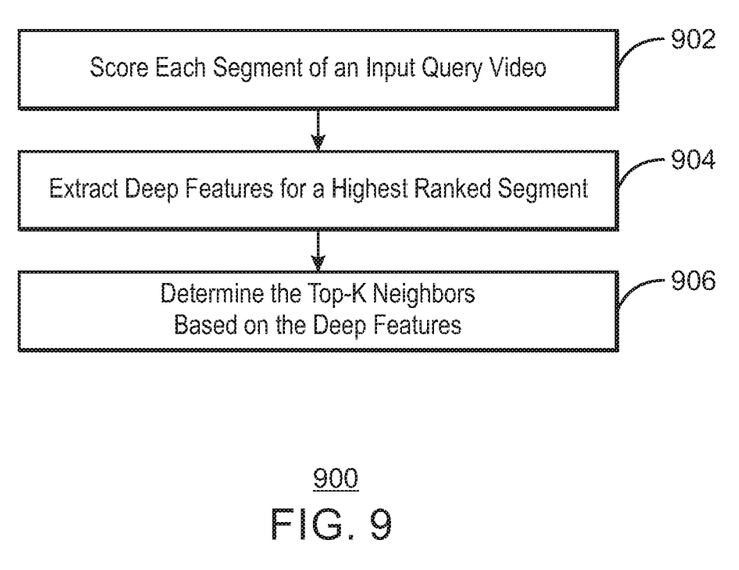
FIG. 9 is a process flow diagram of a method for visual search and retrieval using video summarization.

FIG. 9 is a process flow diagram of a method 900 for visual search and retrieval using sematic information. At block 902, query selection is applied to an input video. In embodiments, input video is segmented into sub-scenes and the best, most important sub-scene is found. An score may be found for each segment and used to rank each sub-scene. In embodiments, the scores indicate the likelihood that a frame is related to the particular class for the frame. At block 904, features are calculated from the highest ranked sub-scene. In embodiments, the features are combined into deep features. At block 906, the deep features are used to retrieve the top-K nearest neighbors.

Figure 10:
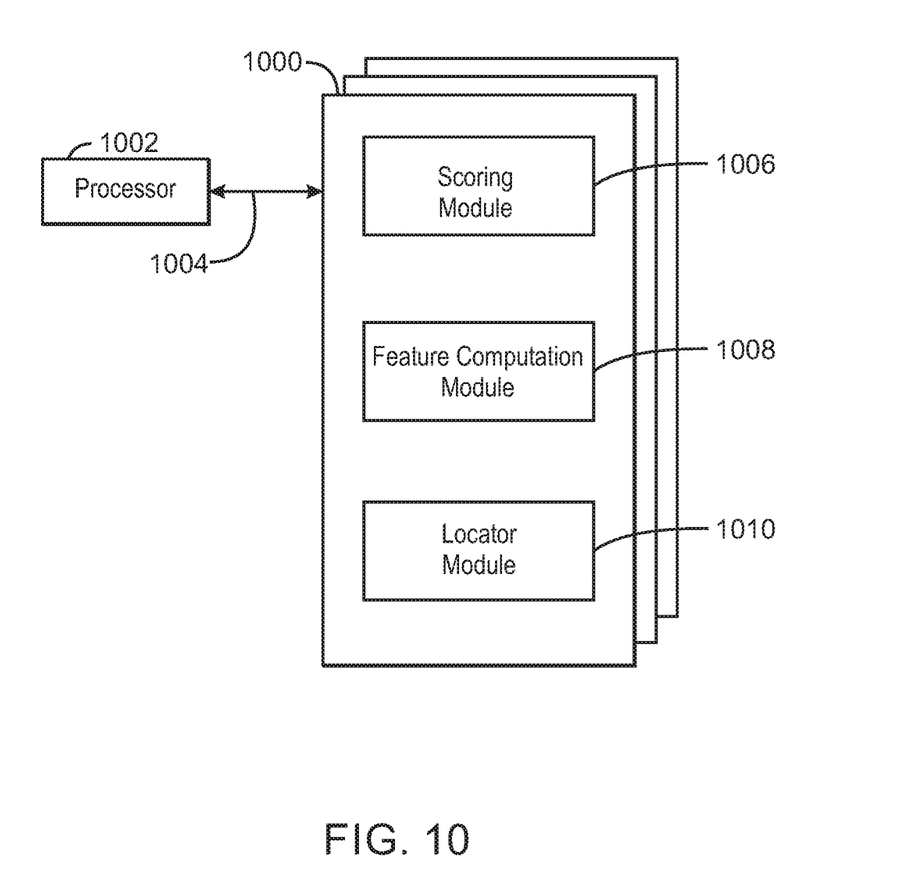
FIG. 10 is a block diagram showing a medium that contains logic for visual search and retrieval.

FIG. 10 is a block diagram showing a medium 1000 that contains logic for visual search and retrieval. The medium 1000 may be a computer-readable medium, including a non-transitory medium that stores code that can be accessed by a processor 1002 over a computer bus 1004. For example, the computer-readable medium 1000 can be volatile or non-volatile data storage device. The medium 1000 can also be a logic unit, such as an Application Specific Integrated Circuit (ASIC), a Field Programmable Gate Array (FPGA), or an arrangement of logic gates implemented in one or more integrated circuits, for example.

The medium 1000 may include modules 1006-1110 configured to perform the techniques described herein. For example, a scoring module 1006 may be configured to generate one or more scores based on an activity probability. A feature computation module 1008 may be configured to extract deep features from the sub-scene with the highest score. A locator module 1010 may be configured to find the top-K nearest neighbors based on the deep features.

The block diagram of FIG. 10 is not intended to indicate that the medium 1000 is to include all of the components shown in FIG. 10. Further, the medium 1000 may include any number of additional components not shown in FIG. 10, depending on the details of the specific implementation.

Example 1 is an apparatus. The apparatus includes a controller to segment a video stream into a plurality of segments based on semantic information; a scoring mechanism to calculate a score for each segment, wherein the score is based, at least partially, on a classification probability of each frame; a extractor to extract deep features from a highest ranked segment; and a comparator to determine the top-K neighbors based on the deep features.

Example 2 includes the apparatus of example 1, including or excluding optional features. In this example, the semantic information is the activity occurring in each frame of the video stream.

Example 3 includes the apparatus of any one of examples 1 to 2, including or excluding optional features. In this example, the deep features are derived from a plurality of features.

Example 4 includes the apparatus of any one of examples 1 to 3, including or excluding optional features. In this example, the activities are segmented by one or more shot boundaries, and each frame is labeled according to an activity class.

Example 5 includes the apparatus of any one of examples 1 to 4, including or excluding optional features. In this example, a convolutional neural network is used to classify each segment, and the classification probability is derived from the classification.

Example 6 includes the apparatus of any one of examples 1 to 5, including or excluding optional features. In this example, a convolutional neural network is used to obtain deep features for each segment.

Example 7 includes the apparatus of any one of examples 1 to 6, including or excluding optional features. In this example, segments lower than a predefined threshold in length are discarded.

Example 8 includes the apparatus of any one of examples 1 to 7, including or excluding optional features. In this example, the scoring mechanism determines a score that is the probability that a frame belongs to an activity based on objects in the frame.

Example 9 includes the apparatus of any one of examples 1 to 8, including or excluding optional features. In this example, the scoring mechanism determines a score that is the probability that an object of a frame belongs to a class of objects combined with the importance of the object for the activity assigned to the frame.

Example 10 includes the apparatus of any one of examples 1 to 9, including or excluding optional features. In this example, a summary of the top-K neighbors are rendered for a user. Optionally, a summary of the top-K neighbors is generated by selecting key image frames for each neighbor. Optionally, a summary of the top-K neighbors is generated by selecting key clips of N-seconds for each neighbor.

Example 11 is a method for visual search and retrieval. The method includes scoring each segment of a query video; extracting deep features for a highest ranked segment; and determining a plurality of nearest neighbors based on the deep features.

Example 12 includes the method of example 11, including or excluding optional features. In this example, the plurality of nearest neighbors contain content similar to the query video.

Example 13 includes the method of any one of examples 11 to 12, including or excluding optional features. In this example, the deep features are derived from a plurality of features.

Example 14 includes the method of any one of examples 11 to 13, including or excluding optional features. In this example, each segment of the query video is segmented based on semantic information. Optionally, the semantic information includes activities, objects, locations, people, or any combination thereof.

Example 15 includes the method of any one of examples 11 to 14, including or excluding optional features. In this example, a convolutional neural network is used to label each frame according to semantic information.

Example 16 includes the method of any one of examples 11 to 15, including or excluding optional features. In this example, a convolutional neural network is used to generate deep features for each segment.

Example 17 includes the method of any one of examples 11 to 16, including or excluding optional features. In this example, a probability that a semantic context is correct for each frame is used to determine, at least partially, the score for each segment.

Example 18 includes the method of any one of examples 11 to 17, including or excluding optional features. In this example, the deep feature is to capture semantic information.

Example 19 includes the method of any one of examples 11 to 18, including or excluding optional features. In this example, the deep feature is used to determine high-level semantic contexts.

Example 20 is a system. The system includes a display; an image capture mechanism; a memory that is to store instructions and that is communicatively coupled to the image capture mechanism and the display; and a processor communicatively coupled to the image capture mechanism, the display, and the memory, wherein when the processor is to execute the instructions, the processor is to: score each segment of an query video, wherein the score is based on semantic information; extract deep features for a highest ranked segment of the query video; and determine the nearest neighbors in a plurality of videos based on the deep features.

Example 21 includes the system of example 20, including or excluding optional features. In this example, the deep features are derived from a plurality of features.

Example 22 includes the system of any one of examples 20 to 21, including or excluding optional features. In this example, the score is based on, at least partially, a classification probability the semantic information for each frame of the query video.

Example 23 includes the system of any one of examples 20 to 22, including or excluding optional features. In this example, a convolutional neural network is used to label each frame of the query video according to the semantic information in the video.

Example 24 includes the system of any one of examples 20 to 23, including or excluding optional features. In this example, the plurality of nearest neighbors is a plurality of videos with semantic information that is similar to semantic information of the query video.

Example 25 includes the system of any one of examples 20 to 24, including or excluding optional features. In this example, a probability that a semantic context is correct for each frame is used to determine, at least partially, the score for each segment.

Example 26 includes the system of any one of examples 20 to 25, including or excluding optional features. In this example, a relationship between semantic information is used to determine a score for each segment.

Example 27 includes the system of any one of examples 20 to 26, including or excluding optional features. In this example, the deep features are extracted via deep learning techniques.

Example 28 includes the system of any one of examples 20 to 27, including or excluding optional features. In this example, the deep features are extracted via a relational dataset.

Example 29 includes the system of any one of examples 20 to 28, including or excluding optional features. In this example, a summary of the nearest neighbors are rendered for a user.

Example 30 is a tangible, non-transitory, computer-readable medium. The computer-readable medium includes instructions that direct the processor to score each segment of an input query video; extract deep features for a highest ranked segment; and determine the top-K neighbors based on the deep features.

Example 31 includes the computer-readable medium of example 30, including or excluding optional features. In this example, the plurality of nearest neighbors contain content similar to the query video.

Example 32 includes the computer-readable medium of any one of examples 30 to 31, including or excluding optional features. In this example, the deep features are derived from a plurality of features.

Example 33 includes the computer-readable medium of any one of examples 30 to 32, including or excluding optional features. In this example, each segment of the query video is segmented based on semantic information. Optionally, the semantic information includes activities, objects, locations, people, or any combination thereof.

Example 34 includes the computer-readable medium of any one of examples 30 to 33, including or excluding optional features. In this example, a convolutional neural network is used to label each frame according to semantic information.

Example 35 includes the computer-readable medium of any one of examples 30 to 34, including or excluding optional features. In this example, a convolutional neural network is used to generate deep features for each segment.

Example 36 includes the computer-readable medium of any one of examples 30 to 35, including or excluding optional features. In this example, a probability that a semantic context is correct for each frame is used to determine, at least partially, the score for each segment.

Example 37 includes the computer-readable medium of any one of examples 30 to 36, including or excluding optional features. In this example, the deep feature is to capture semantic information.

Example 38 includes the computer-readable medium of any one of examples 30 to 37, including or excluding optional features. In this example, the deep feature is used to determine high-level semantic contexts.

Example 39 is an apparatus. The apparatus includes instructions that direct the processor to a controller to segment a video stream into a plurality of segments based on semantic information; a means to calculate a score for each segment, wherein the score is based, at least partially, on a classification probability of each frame; a means to extract deep features from a highest ranked segment; and a means to determine the top-K neighbors based on the deep features.

Example 40 includes the apparatus of example 39, including or excluding optional features. In this example, the semantic information is the activity occurring in each frame of the video stream.

Example 41 includes the apparatus of any one of examples 39 to 40, including or excluding optional features. In this example, the deep features are derived from a plurality of features.

Example 42 includes the apparatus of any one of examples 39 to 41, including or excluding optional features. In this example, the activities are segmented by one or more shot boundaries, and each frame is labeled according to an activity class.

Example 43 includes the apparatus of any one of examples 39 to 42, including or excluding optional features. In this example, a convolutional neural network is used to classify each segment, and the classification probability is derived from the classification.

Example 44 includes the apparatus of any one of examples 39 to 43, including or excluding optional features. In this example, a convolutional neural network is used to obtain deep features for each segment.

Example 45 includes the apparatus of any one of examples 39 to 44, including or excluding optional features. In this example, segments lower than a predefined threshold in length are discarded.

Example 46 includes the apparatus of any one of examples 39 to 45, including or excluding optional features. In this example, the means to calculate the score determines a score that is the probability that a frame belongs to an activity based on objects in the frame.

Example 47 includes the apparatus of any one of examples 39 to 46, including or excluding optional features. In this example, the means to calculate the score determines a score that is the probability that an object of a frame belongs to a class of objects combined with the importance of the object for the activity assigned to the frame.

Example 48 includes the apparatus of any one of examples 39 to 47, including or excluding optional features. In this example, a summary of the top-K neighbors are rendered for a user.

Example 49 includes the apparatus of any one of examples 39 to 48, including or excluding optional features. In this example, a summary of the top-K neighbors is generated by selecting key image frames for each neighbor.

Example 50 includes the apparatus of any one of examples 39 to 49, including or excluding optional features. In this example, a summary of the top-K neighbors is generated by selecting key clips of N-seconds for each neighbor.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus, comprising:
   a processor to:
   segment a video stream into a plurality of segments based on semantic information;
   calculate a score for each segment, wherein the score is based, at least partially, on a classification probability of each frame, such that the score is a probability that an object of a frame belongs to a class of objects combined with an importance of the object for an activity assigned via semantic information to the frame;

extract deep features from a highest ranked segment; and output a top-K videos based on the deep features.

2. The apparatus of claim 1, wherein the semantic information is the activity occurring in each frame of the video stream.

3. The apparatus of claim 1, wherein the deep features are derived from a plurality of features.

4. The apparatus of claim 1, wherein the semantic information is segmented by one or more shot boundaries, and each frame is labeled according to a class of semantic information.

5. The apparatus of claim 1, wherein a convolutional neural network is used to classify each segment, and the classification probability is derived from the classification.

6. The apparatus of claim 1, wherein a convolutional neural network is used to obtain deep features for each segment.

7. The apparatus of claim 1, wherein segments lower than a predefined threshold in length are discarded.

8. The apparatus of claim 1, wherein the score comprises a probability that a frame belongs to an activity based on objects in the frame.

9. The apparatus of claim 1, wherein a summary of the top-K videos is rendered for a user.

10. The apparatus of claim 9, wherein a summary of the top-K videos is generated by selecting key image frames for each neighbor.

11. The apparatus of claim 9, wherein a summary of the top-K videos is generated by selecting key clips of N-seconds for each neighbor.

12. A method for visual search and retrieval, comprising:
scoring each segment of a query video, such that a score is a probability that an object of a frame belongs to a class of objects combined with an importance of the object for an activity assigned via semantic information to the frame;
extracting deep features for a highest ranked segment; and
outputting a plurality of nearest video neighbors based on the deep features.

13. The method of claim 12, wherein the plurality of nearest video neighbors contain content similar to the query video.

14. The method of claim 12, wherein the deep features are derived from a plurality of features.

15. The method of claim 12, wherein each segment of the query video is segmented based on the semantic information.

16. The method of claim 12, wherein the semantic information includes activities, objects, locations, people, or any combination thereof.

17. A system, comprising:
a display;
an image capture mechanism;
a memory that is to store instructions and that is communicatively coupled to the image capture mechanism and the display; and
a processor communicatively coupled to the image capture mechanism, the display, and the memory, wherein when the processor is to execute the instructions, the processor is to:
score each segment of a query video, wherein the score is based on semantic information, such that the score is a probability that an object of a frame belongs to a class of objects combined with an importance of the object for an activity assigned via semantic information to the frame;
extract deep features for a highest ranked segment of the query video; and
output a plurality of nearest video neighbors in a plurality of videos based on the deep features.

18. The system of claim 17, wherein the deep features are derived from a plurality of features.

19. The system of claim 17, wherein the score is based on, at least partially, a classification probability the semantic information for each frame of the query video.

20. The system of claim 17, wherein a convolutional neural network is used to label each frame of the query video according to the semantic information in the video.

21. A tangible, non-transitory, computer-readable medium comprising instructions that, when executed by a processor, direct the processor to:
score each segment of an input query video, such that the score is a probability that an object of a frame belongs to a class of objects combined with an importance of the object for an activity assigned via semantic information to the frame;
extract deep features for a highest ranked segment; and
output a top-K videos based on the deep features.

22. The computer readable medium of claim 21, wherein the top-K videos contain content similar to the query video.

23. The computer readable medium of claim 21, wherein the deep features are derived from a plurality of features.

24. The computer readable medium of claim 21, wherein each segment of the query video is segmented based on semantic information.

* * * * *